Oct. 10, 1967  H. STAHLECKER  3,345,722
TWIN PRESSURE ROLLERS FOR SPINNING OR TWISTING MACHINES
Filed Sept. 24, 1965
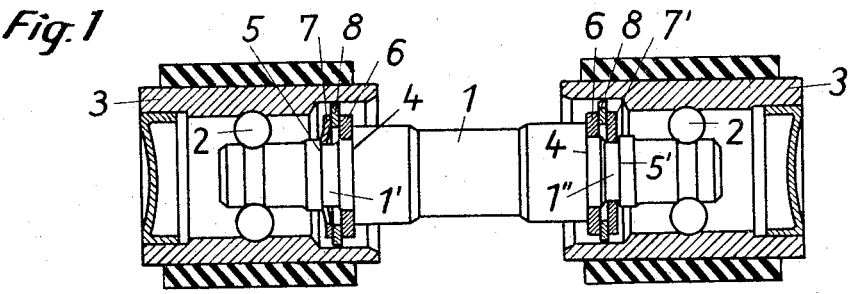
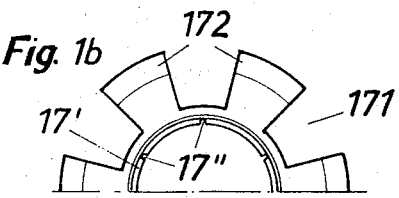
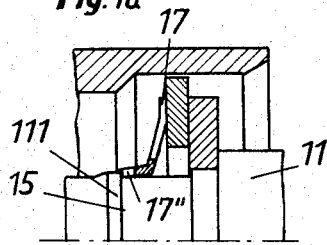
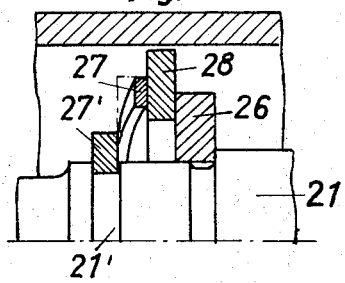
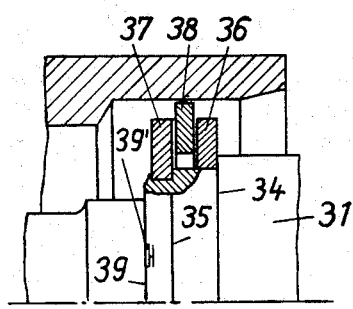
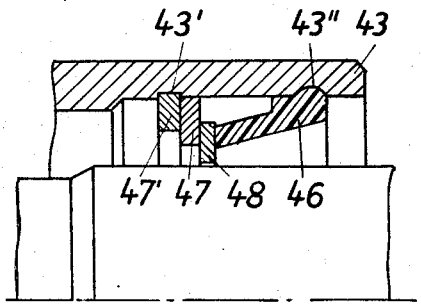
INVENTOR
HANS STAHLECKER
BY Dicke & Craig
ATTORNEYS

3,345,722
TWIN PRESSURE ROLLERS FOR SPINNING OR TWISTING MACHINES

Hans Stahlecker, Sussen, Wurttemberg, Germany, assignor to Spindelfabrik Süssen Schurr, Stahlecker & Grill G.m.b.H., Sussen, Wurttemberg, Germany
Filed Sept. 24, 1965, Ser. No. 489,812
Claims priority, application Germany, Oct. 5, 1964, S 93,627
10 Claims. (Cl. 29—116)

The present invention relates to improvements in twin pressure rollers for spinning or twisting machines in which each pair of rollers comprises a common shaft, roller bodies which are rotatable on antifriction bearings on this shaft, and sealing gaskets which are mounted between the shaft and the roller bodies.

For pressure rollers of the above-mentioned type it is very desirable that they may operate for a great length of time without service, that is, without requiring new greasing and time-wasting cleaning operations. This may be attained especially by reliably sealing the bearings so as to prevent the discharge of lubricants to the outside and the entry of fly. For this purpose it has already been proposed to provide the shaft of the pressure rollers with special sealing flanges which are separated from the roller bodies by narrow sealing gaps and the edges of which serve as blades for cutting up any entering fly. Such sealing structures have, however, not proved satisfactory in all cases and especially not if for improving the load capacity, for example, of ball bearings, the runways for the balls in the outer races and on the inner races or on the shaft itself are cambered. For inserting the balls it is then necessary to shift one runway eccentrically to the other which can be done only if the sealing gap between the roller body and the sealing flange has a sufficient width. Such a wide sealing gap, however, no longer permits a proper sealing effect.

It has therefore been proposed to provide sealing gaskets which produce a sealing effect without engaging with and gliding along the roller body and are slidable along the shaft, but are not slipped to the required position on the shaft until after the bearing has been assembled. However, even such a structure does not permit the sealing gap to be made of such a small width that it will fully prevent the loss of lubricant from the inside of the bearing or the entry of fly into the bearing since in determining the size of the sealing gap it is necessary to take into account the flexure of the shaft and the possible tilting of the roller bodies which may occur during the operation of the pressure rollers.

It is an object of the present invention to eliminate the above-mentioned disadvantages by providing a sealing structure in which one or more sealing gaskets are mounted between the guide elements either on the shaft or in the roller body but are movable in radial directions, and are of such a size that only a narrow sealing gap will be formed between them and the roller body or the shaft.

Such an inventive sealing structure may be of different designs. Thus, for example, one of the guide elements may consist of a guide washer with plane parallel faces, while the other guide element may consist of a spring washer which acts resiliently in the axial direction upon the radially movable sealing gasket. According to another embodiment of the invention, both guide elements for the radially movable sealing gasket may consist of guide washers with plane parallel faces, while according to a further embodiment of the invention the outer guide element may consist of a ring of plastic which is mounted within an annular groove in the roller body so that its guide surface abuts against the sealing gasket.

These as well as further features and advantages of the present invention will become more clearly apparent from the following detailed description thereof which is to be read with reference to the accompanying drawings, in which—

FIGURE 1 shows a longitudinal section of a pair of twin pressure rollers each of which is provided with a single-row ball bearing and a sealing gasket which is held at the outside facing the center of the shaft by a washer with plane parallel faces, while at the inside facing the bearing the sealing gasket of the left roller is held by a spring washer and the sealing gasket of the right roller is held by another plane washer;

FIGURE 1a shows a partial section of a sealing structure similar to that according to FIGURE 1 but on a larger scale, in which the sealing gasket is held at the inside by a ring of an angular cross section which is divided into axially resilient segments;

FIGURE 1b shows a plan view of the upper half of the angular ring according to FIGURE 1a;

FIGURE 2 shows a partial section of a sealing structure, in which the inner guide element consists of a conventional spring compensating washer;

FIGURE 3 shows a partial section of a sealing structure in which both guide elements for the radially movable sealing gasket consist of plane washers which are supported on shoulders of the shaft; while FIGURE 4 shows a partial section of a sealing structure, in which the outer guide element consists of a washer of plastic which is fitted into the wall of the bore of the roller body.

As illustrated in FIGURE 1, the shaft 1 for the two rollers carries near each end a row of balls 2 on which one of the roller bodies 3 is mounted. The shoulders 4 of shaft 1 support the outer washers 6 for holding and guiding the sealing gaskets 8. In the left roller of FIGURE 1, the inner guide element for the sealing gasket 8 consists of a slotted serrated spring washer 7 which is slightly resilient in the axial direction and is mounted in an annular groove 1' in shaft 1 and abuts against the shoulder 5 of the shaft. Shoulders 4 and 5 are spaced from each other at a distance which depends upon the thickness of gasket 8 and the guide elements 6 and 7 and upon the desired resilience of the spring washer 7 in the axial direction and which is made so large that the gasket 8 will be held between the guide elements 6 and 7 but be slightly movable in radial directions. The guide elements 6 and 7 have an outer diameter of such a size that their outer peripheral surfaces and the adjacent wall portion of the bore in the roller body 3 define on each side of gasket 8 an annular gap of a relatively large width which may be of approximately the same size as that of the inner annular gap which is formed between the inner surface of gasket 8 and shaft 1 when the gasket is centered relative to the shaft.

In the right roller of FIGURE 1, the inner guide element 7' consists of a so-called crescent washer or split ring snap washer which is inserted into groove 1" in shaft 1. The dimensions of gasket 8 and guide elements 6 and 7' and the distance between the shoulders 4 and 5' are also in this case so coordinated that gasket 8 will be held between the guide elements 6 and 7' so as to be slightly movable in radial directions. Since both gaskets 8 are movable in radial directions between their guide elements, the axial sealing gaps between the gaskets 8 and the roller bodies 3 may be made very small without danger that the respective roller body will press excessively upon the gasket when the shaft and the roller body are disposed eccentrically to each other. In the operation of the pressure rollers, gasket 8 will in this case be shifted in a radial direction to an eccentric position relative to the shaft in response to relative eccentric shifting between the roller body and the shaft that is of a greater distance than the sealing gap space; after a few revolutions of the roller body the gasket will assume a position with a small gap around its entire periphery adjacent to the roller body because of the small pivoting motions, shocks and vibrations occurring during the few revolutions so that there is no longer any frictional sliding between the gasket and the roller body. It should at this point be emphasized that for the purpose of illustration the sealing gaps and the play are partly shown of larger sizes than would actually be employed.

In FIGURES 1a and 1b, the inner guide element 17 is made of an axially resilient construction similar to that of the guide element 7 in FIGURE 1, but it consists in this case of a steel washer which is divided by slots 171 into axially resilient segments 172 and is provided with a hub 17′ which due to its slots 17″ is slightly resilient in radial directions. During the assembly of the pressure rollers, this guide washer may be slipped over the flange 111 on shaft 11 and will then be supported by the shoulder 15.

In FIGURE 2, the sealing gasket 28 is pressed by a conventional spring compensating washer 27 against the outer guide washer 26. The axial position of washer 27 which serves as the inner guide element is maintained by a spring ring 27′ which is inserted into an annular groove 21′ in shaft 21. It is also possible to make the resilient washer 27 of a resilient plastic.

In FIGURE 3, the radially movable sealing gasket 38 is guided by two plane parallel guide washers 36 and 37. For supporting these guide washers 36 and 37, shaft 31 is provided with special shoulders 34 and 35. The inner guide washer 37 is rigidly secured to shaft 31, for example, by upsetting the shoulder 39 at several points 39′. Shoulders 34 and 35 are spaced from each other at such a distance that the sealing gasket 38 will be guided in axial directions and still remain slidable in radial directions.

FIGURE 4 finally shows a spring ring 47′ which is mounted in an annular groove 43′ in the roller body 43 and abuts against the inner guide washer 47. The outer guide element for the sealing gasket 48 is provided in the form of a ring 46 of plastic which also serves as a resilient element and is mounted in an annular groove 43″ in the roller body 43 so that its guide surface abuts against the gasket 48.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. Twin pressure rollers, for a spinning or twisting machine, comprising: a common shaft forming one member; anti-friction bearing means on said shaft; a pair of roller bodies rotatably mounted on said bearing means and each forming another member; seal means for sealing the space between said shaft and each roller body including at least one gasket spaced a substantial distance from one of said members for substantial radial bodily movement toward and away from said one member, said gasket having such a size that only a relatively small sealing gap is formed between said gasket and the other of said members, and guide means mounted on said one member and on each side of said gasket for radially guiding and axially retaining said gasket for sealing the space between said gasket and said one member for all radial displacement positions of said gasket relative to said one member.

2. Twin pressure rollers as defined in claim 1, in which one of said guide means consists of a guide washer having plane parallel faces, while the other guide means consists of a spring washer acting resiliently in the axial direction upon said gasket.

3. Twin pressure rollers as defined in claim 2, in which said spring washer consists of sheet steel and is provided with a hub and divided by slots into resilient segments.

4. Twin pressure rollers as defined in claim 2, in which said spring washer consists of an axially undulating compensating washer.

5. Twin pressure rollers as defined in claim 2, in which said spring washer consists of a resilient synthetic plastic.

6. Twin pressure rollers as defined in claim 1, in which both guide means for said radially movable gasket consists of guide washers having plane parallel faces.

7. Twin pressure rollers as defined in claim 6, in which said shaft is provided with a separate shoulder for supporting each guide washer in the axial direction.

8. Twin pressure rollers as defined in claim 6, wherein said shaft has a shoulder portion axially engaging one of said guide washers on one side and a deformed portion axially engaging said one guide washer on its other side to rigidly secure said one guide washer to said shaft.

9. Twin pressure rollers as defined in claim 1, in which said roller body has an annular groove in its inner wall, one of said guide elements consisting of a ring of resilient plastic and being mounted in said groove and having a guide surface engaging upon said gasket.

10. Twin pressure rollers as defined in claim 1, wherein said guide means frictionally engages said gasket to securely hold said gasket in any of its radially displaced positions.

References Cited

UNITED STATES PATENTS

| | | | |
|---|---|---|---|
| 2,641,515 | 6/1953 | Bankauf et al. | 308—20 |
| 2,714,229 | 8/1955 | Rulon-Miller | 29—116 |
| 2,716,780 | 9/1955 | Swanson | 29—116 |
| 2,885,247 | 5/1959 | Schlums | 29—116 X |
| 2,948,024 | 8/1960 | Swanson | 29—116 |
| 2,962,770 | 12/1960 | Ingraham | 29—116 |
| 2,991,514 | 7/1961 | Cotchett | 29—116 |
| 3,212,168 | 10/1965 | Sommer | 29—116 |
| 3,228,088 | 1/1966 | Schaeffler et al. | 29—116 |

BILLY J. WILHITE, *Primary Examiner.*